US011494522B2

(12) United States Patent
Meier et al.

(10) Patent No.: US 11,494,522 B2
(45) Date of Patent: Nov. 8, 2022

(54) SEMICONDUCTOR DEVICE WITH SELF-LOCK SECURITY AND ASSOCIATED METHODS AND SYSTEMS

(71) Applicant: Micron Technology, Inc., Boise, ID (US)

(72) Inventors: Nathaniel J. Meier, Boise, ID (US); Brenton P. Van Leeuwen, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/677,486

(22) Filed: Nov. 7, 2019

(65) Prior Publication Data

US 2021/0141944 A1 May 13, 2021

(51) Int. Cl.
*G06F 21/79* (2013.01)

(52) U.S. Cl.
CPC .................................. *G06F 21/79* (2013.01)

(58) Field of Classification Search
CPC ...................................................... G06F 21/79
USPC ............................................................ 726/34
See application file for complete search history.

(56) References Cited

U.S. PATENT DOCUMENTS

| 5,652,890 | A | * | 7/1997 | Foster | ..................... | G06F 1/324 |
| | | | | | | 713/323 |
| 5,889,679 | A | * | 3/1999 | Henry | ................. | G06F 15/7867 |
| | | | | | | 716/119 |
| 7,865,659 | B2 | | 1/2011 | Ramesh et al. | | |
| 8,286,883 | B2 | | 10/2012 | Asnaashari et al. | | |
| 8,607,210 | B2 | | 12/2013 | Mollichelli et al. | | |
| 9,419,951 | B1 | | 8/2016 | Felsher et al. | | |
| 9,870,837 | B1 | * | 1/2018 | Shim | ...................... | G11C 17/18 |

(Continued)

FOREIGN PATENT DOCUMENTS

| CN | 1747064 | A | * | 3/2006 | ........... | G11C 11/406 |
| CN | 1790290 | B | * | 2/2012 | ......... | G06F 21/6245 |

(Continued)

OTHER PUBLICATIONS

Bovenzi et al. "Towards identifying OS-level anomalies to detect application software failures", IEE, doi: 10.1109/IWMN.2011. 6088494, 2011, pp. 71-760 (Year: 2011).*

(Continued)

*Primary Examiner* — Peter C Shaw
(74) *Attorney, Agent, or Firm* — Perkins Coie LLP (57) ABSTRACT

Memory devices, systems including memory devices, and methods of operating memory devices are described, in which self-lock security may be implemented to control access to a fuse array (or other secure features) of the memory devices based on a predefined event associated with the memory device operation. The predefined event may include an operating parameter of the memory device, one or more commands directed to the memory device, or both. The memory device may monitor the predefined event and determine that the predefined event satisfies a threshold. The threshold may be related to a time elapsed since the predefined event has occurred or a certain pattern in the one or more commands. Subsequently, the memory device may disable a circuit configured to access the fuse array based on the determination such that an access to the fuse array is no longer allowed.

19 Claims, 6 Drawing Sheets

(56) References Cited

U.S. PATENT DOCUMENTS

| | | | |
|---|---|---|---|
| 10,600,498 B1 | 3/2020 | Ayyapureddi | |
| 10,755,799 B1 | 8/2020 | Montierth | |
| 10,803,969 B1 | 10/2020 | Bell et al. | |
| 2004/0170068 A1 | 9/2004 | Williams | |
| 2005/0289355 A1 | 12/2005 | Kitariev et al. | |
| 2006/0085702 A1 | 4/2006 | Qureshi et al. | |
| 2006/0168367 A1* | 7/2006 | Beckett | A61N 1/36007 710/22 |
| 2007/0039060 A1* | 2/2007 | Jamieson | G11C 16/22 726/34 |
| 2008/0143373 A1 | 6/2008 | Bonaccio et al. | |
| 2009/0007275 A1 | 1/2009 | Gehrmann et al. | |
| 2009/0089529 A1 | 4/2009 | Miranda et al. | |
| 2011/0154103 A1* | 6/2011 | Bulusu | G06F 11/1658 718/1 |
| 2011/0167193 A1 | 7/2011 | Ayyapureddi | |
| 2011/0167243 A1* | 7/2011 | Yip | G06F 9/3857 712/228 |
| 2011/0194333 A1 | 8/2011 | Kim et al. | |
| 2012/0026018 A1* | 2/2012 | Lin | G06F 13/4068 341/26 |
| 2013/0334897 A1* | 12/2013 | Baumann | G11C 7/24 307/116 |
| 2014/0063894 A1 | 3/2014 | Yoon et al. | |
| 2014/0082438 A1* | 3/2014 | Yoon | G06F 11/1008 714/710 |
| 2014/0189365 A1 | 7/2014 | Cox et al. | |
| 2014/0361828 A1* | 12/2014 | Lundberg | H03K 19/0008 327/543 |
| 2015/0033338 A1 | 1/2015 | Neve De Mevergnies et al. | |
| 2015/0255168 A1* | 9/2015 | Song | G11C 11/40611 365/96 |
| 2015/0357051 A1* | 12/2015 | Lee | G11C 17/18 365/96 |
| 2016/0099810 A1 | 4/2016 | Li et al. | |
| 2016/0321472 A1 | 11/2016 | Pedersen | |
| 2017/0098082 A1* | 4/2017 | Henry | H04L 9/3242 |
| 2018/0096979 A1 | 4/2018 | Pappu et al. | |
| 2018/0152444 A1 | 5/2018 | Caterino et al. | |
| 2018/0167199 A1 | 6/2018 | Kaul et al. | |
| 2018/0189493 A1 | 7/2018 | Schilder et al. | |
| 2018/0307867 A1 | 10/2018 | Dover | |
| 2019/0237148 A1* | 8/2019 | Senoo | G11C 16/08 |
| 2019/0349426 A1 | 11/2019 | Smith et al. | |
| 2020/0274894 A1* | 8/2020 | Argoeti | H04L 63/1408 |
| 2020/0285737 A1* | 9/2020 | Kraus | G06F 21/552 |
| 2020/0334064 A1* | 10/2020 | Jiang | G06F 9/45558 |
| 2020/0334171 A1 | 10/2020 | Meier | |
| 2021/0026542 A1 | 1/2021 | Carlson et al. | |
| 2021/0141741 A1 | 5/2021 | Meier et al. | |
| 2021/0141943 A1 | 5/2021 | Van Leeuwen et al. | |

FOREIGN PATENT DOCUMENTS

| | | | | |
|---|---|---|---|---|
| CN | 108089630 A | * | 5/2018 | B60K 17/165 |
| CN | 108345808 A | * | 7/2018 | |
| FR | 3047348 A1 | * | 8/2017 | G11C 7/24 |
| JP | 2011258283 A | * | 12/2011 | |
| KR | 20100031148 A | | 3/2010 | |
| KR | 20100064158 A | * | 6/2010 | G11C 29/04 |
| WO | WO-2005069591 A1 | * | 7/2005 | G06F 21/575 |

OTHER PUBLICATIONS

IP.com "On chip and off-core engine based dynamically programmable trigger for advanced processor performance analysis", IP.com, IPCOM000257920D, Mar. 23, 2019, pp. 1-6 (Year: 2019).*

Ipcom, "Method and Apparatus for Partial Re-progarammability of a One-Time Programmable Fuse Array", IP.com, IPCOM00018657D, Aug. 6, 2009, pp. 1-5. (Year: 2009).*

Choi et al., "A Study of ESMTC(Enterprise Security Management System Based on Threshold Classification)", IEEE, doi: 10.1109/ICISA.2012.6220971, 2012, pp. 1-6. (Year: 2012).*

Noel et al., "Correlating intrusion events and building attack scenarios through attack graph distances", IEEE, doi: 10.1109/CSAC.2004.11, 2004, pp. 350-359. (Year: 2004).*

Yarng et al., "Profiling cyberattacks using alert regression profiles", IEEE, doi: 10.1109/GLOCOM.2003.1258479, 2003, pp. 1456-1460 vol.3. (Year: 2003).*

International Application No. PCT/US2020/054860—International Search Report and Written Opinion, dated Jan. 27, 2021, 11 pages.

International Application No. PCT/US2020/054866—International Search Report and Written Opinion, dated Jan. 26, 2021, 11 pages.

International Application No. PCT/US2020/055128—International Search Report and Written Opinion, dated Jan. 26, 2021, 9 pages.

International Application No. PCT/US2020/055118—International Search Report and Written Opinion, dated Mar. 5, 2021, 8 pages.

* cited by examiner

SEMICONDUCTOR DEVICE WITH SELF-LOCK SECURITY AND ASSOCIATED METHODS AND SYSTEMS

TECHNICAL FIELD

The present disclosure generally relates to semiconductor devices, and more particularly relates to a semiconductor device with self-lock security and associated methods and systems.

BACKGROUND

Memory devices are widely used to store information related to various electronic devices such as computers, wireless communication devices, cameras, digital displays, and the like. Memory devices are frequently provided as internal, semiconductor, integrated circuits and/or external removable devices in computers or other electronic devices. There are many different types of memory, including volatile and nonvolatile memory. Volatile memory, including random-access memory (RAM), static random-access memory (SRAM), dynamic random-access memory (DRAM), and synchronous dynamic random-access memory (SDRAM), among others, require a source of applied power to maintain its data. Nonvolatile memory, by contrast, can retain its stored data even when not externally powered. Nonvolatile memory is available in a wide variety of technologies, including flash memory (e.g., NAND and NOR), phase change memory (PCM), ferroelectric random-access memory (FeRAM), resistive random-access memory (RRAM), and magnetic random-access memory (MRAM), among others. Improving memory devices, generally, may include increasing memory cell density, increasing read/write speeds or otherwise reducing operational latency, increasing reliability, increasing data retention, reducing power consumption, or reducing manufacturing costs, among other metrics.

DETAILED DESCRIPTION

A memory device may support various operational features. Some of the operational features may be described in a specification of the memory device such that an end-user of the memory device may utilize the operational features described in the specification. In addition, the memory device may be configured to support special operational features that require controlled access, which may be referred to as secure features. Such secure features may include design-for-test (DFT) functions (which may also be referred to as design-for-manufacturing (DFM) functions). In some embodiments, the DFT functions include vendor-specific features or functions (e.g., test modes that are accessible only by the manufacture of the memory device), special features or functions (e.g., certain test modes, special capabilities) that may be activated for a selected customer or a selected set of memory devices, an access to a fuse array (or other nonvolatile memory elements of the memory device), or the like. Various test modes, features, and/or functions under the DFT functions may be referred to as DFT modes, in some cases. The DFT functions provide flexibility to modify operational characteristics of the memory device without implementing permanent changes to the memory device design. For example, the DFT functions may enable the memory device to perform certain operations temporarily under the test mode to evaluate feasibility of the operations. In some cases, the DFT functions may program the fuse array such that a special capability can be enabled as a default for certain customers. In other examples, the DFT (or DFM) functions may selectively configure the memory device to operate pursuant to customer requirements—e.g., a customer requiring ×4 memory devices while another customer requiring ×8 memory devices.

The DFT functions may be abused by an unauthorized or hostile actor to permanently damage the memory device or degrade the memory device in undesirable ways. For example, the memory device may store various operational information in the nonvolatile memory elements, which the memory device needs to retain without power. The operational information stored in the nonvolatile memory elements may include critical information associated with the secure features (e.g., DFT functions, entries to the test modes and/or special capabilities) and/or other conditions for the memory device to operate, such as trim settings, redundancy implementations, optimal timing/biasing parameters, among others. Further, some of the nonvolatile memory elements (e.g., fuses, anti-fuses, blown capacitor devices, transistors with blown gate-oxide) are regarded as one-time programmable memory cells due to their irreversible programming characteristics. Thus, access to the nonvolatile memory elements (e.g., a fuse array) may permit a hostile or inadvertent actor to permanently alter the critical information (due to their irreversible programming characteristics), which in turn, result in harmful consequences to the performance or functionality of the memory device (e.g., by activating a test mode functionality that disables the memory device).

Similarly, various test modes of the memory device (e.g., the vendor-specific features or functions, the special features or functions selectively activated) may benefit from being protected against hostile or inadvertent actors, too. In some cases, securing access to the test modes prevent users from accessing certain aspects of the memory device's internal operations or prohibit unauthorized users from accessing special capabilities associated with the test modes (e.g., when the users did not pay for the special capabilities). Additionally, securing access to the test modes can mitigate risks from modifying some voltages associated with the test modes, which may permanently damage certain devices or reduce the lifetime of the devices, if not properly managed. As such, access to the test modes needs to be strictly controlled. In some embodiments, various circuits and components that perform the DFT functions may be coupled to a common internal potential of the memory device, and controlled access to the DFT functions may be implemented via controlled access to the common internal potential.

Several embodiments of the present technology are directed to provide various levels of security against unauthorized access to the nonvolatile memory elements of a memory device—e.g., secure access to a fuse array (e.g., reading information from the fuse array, allowing changes to functions, test modes, or timings of the memory device defined in the fuse array). Although the present technology is described with respect to providing security to the fuse access functions and modules, the present technology is not limited thereto. For example, the security features described herein may be implemented to provide security to other modules or functions of the memory device such that only authenticated accesses to such modules or functions may be allowed, namely secure feature accesses for the memory device. The secure feature accesses may include secure accesses to the DFT functions, such as entries to test modes (e.g., directed to temporary changes to test modes), special feature modes or commands (e.g., allowing only a limited customer to have access to), mode registers and/or specialized registers, a nonvolatile memory space that could be either permanent (if based on one-time programmable elements) or flexible (if based on NAND memory cells or PCM cells), among others. In some embodiments, some of the special feature modes may be hidden (e.g., not described in a specification of the memory device) from a customer. Further, the fuse array may be replaced by (or provided in addition to) an array of other types of nonvolatile memory elements—e.g., one or more conductive layers (e.g., metal interconnect layers), metal switches, blown capacitor devices, transistors with blown gate-oxide, NAND memory cells, PCM cells, magnetic memory cells.

The present technology may prohibit (e.g., lock) accesses to a fuse array (or the DFT functions or other features of the DFT functions) of a memory device when a certain condition is satisfied—e.g., a time elapsed after a triggering event, execution of one or more pre-identified commands, programming of certain mode registers. Such security schemes disclosed herein may be regarded as self-lock security because the memory device does not require an external input (e.g., a command received from a host device or user, a security key or password provided by a host device or user) to block accesses to the fuse array (or other secure features). The security schemes may provide protection against unintentional or undesired modification of the critical operating condition stored in the fuse array, reverse engineering attempts toward various features of the DFT functions, nefarious accesses to the fuse array (e.g., the fuse array and/or associated control circuitry) to cause irreversible damage to the memory device (e.g., by irreversibly altering contents stored in the fuse array), among others.

In some embodiments, a memory device may include a module (e.g., a set of components or circuits) that is coupled to a circuit (e.g., a test-mode control circuit) configured to access a fuse array of the memory device. The module may be configured to monitor a predefined event associated with the memory device. In some implementations, the predefined event may be one or more operating parameters of the memory device (e.g., a voltage supply to the memory device). In some implementations, the predefined event may be one or more commands executed by the memory device (e.g., Activate command, Precharge command, Load-Mode-Register (LMR) commands, read commands, write commands). Further, the module may be configured to determine that the predefined event satisfies a threshold associated with the predefined event—e.g., a fixed time elapsed after a power-up sequence of the memory device, a fixed time elapsed after execution of a first Activate command, execution of an LMR command programming a multi-purpose mode register (MPR), execution of a fifth read command since the power-up event, or the like. Upon determining that the predefined event satisfied the threshold, the module may disable (e.g., deactivate) the circuit configured to access the fuse array (or other protection circuitry configured to access the DFT functions) on the memory device. Once access to the fuse array is prohibited (locked) by deactivating the circuit (or deactivating the protection circuitry), turning the memory device off-and-on may be required to unlock the circuit allowing access to the fuse array (or to unlock the protection circuitry allowing access to the DFT functions), in some implementations.

A memory device that supports an embodiment of the present technology is described with reference to FIG. 1. A conceptual illustration of an example self-lock security and an example process flow are provided with reference to FIG. 2. FIG. 3 illustrates various aspects of a circuit configuration that implements the self-lock security in the memory device in accordance with embodiments of the present technology. A memory system that supports embodiments of the present technology is described with reference to FIG. 4. Flowcharts illustrating various methods of operating the memory device are described with reference to FIGS. 5 and 6.

Figure 1:
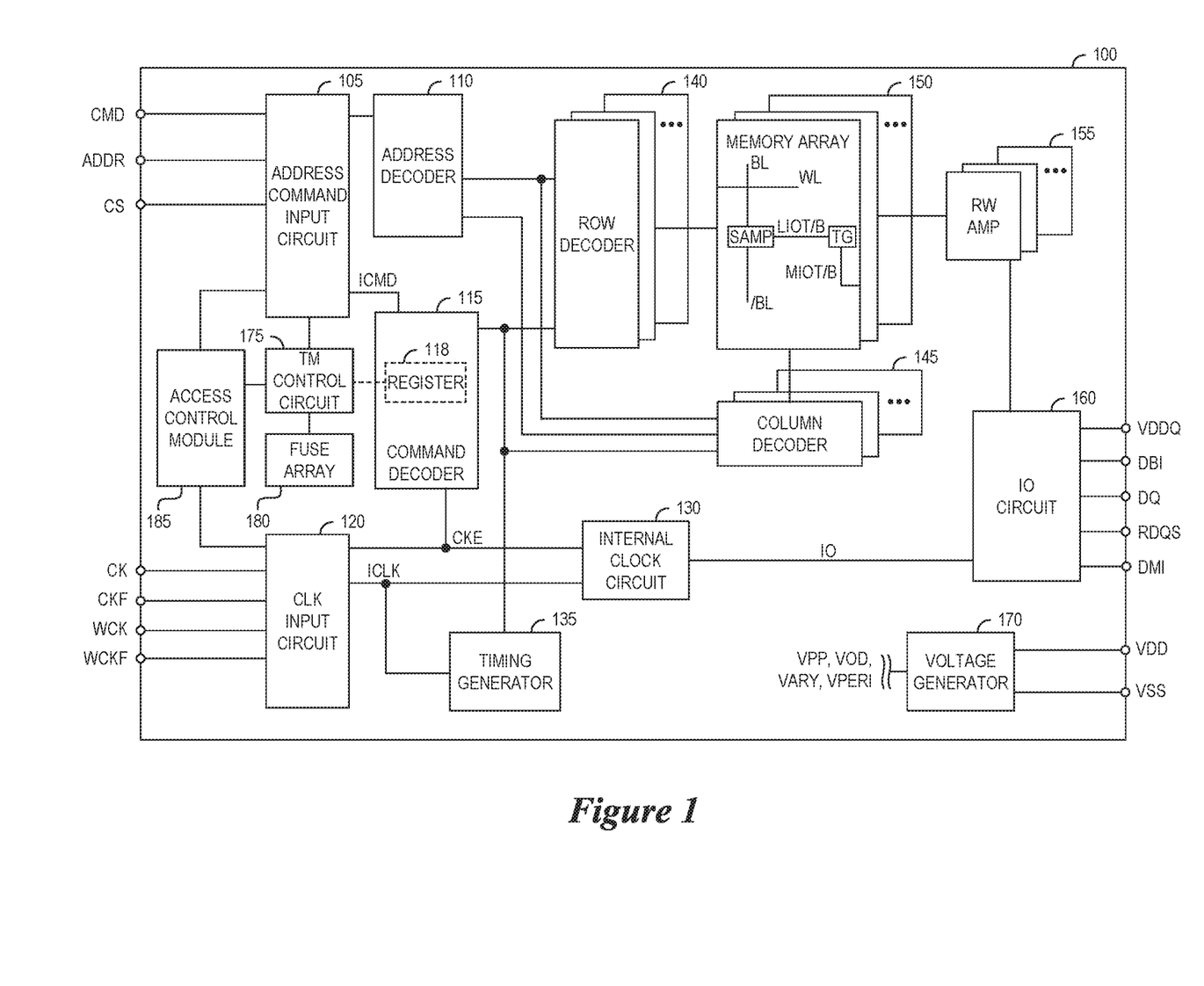
FIG. 1 is a block diagram schematically illustrating a memory device in accordance with an embodiment of the present technology.

FIG. 1 is a block diagram schematically illustrating a memory device 100 in accordance with an embodiment of the present technology. The memory device 100 may include an array of memory cells, such as memory array 150. The memory array 150 may include a plurality of banks (e.g., banks 0-15 in the example of FIG. 1), and each bank may include a plurality of word lines (WL), a plurality of bit lines (BL), and a plurality of memory cells (e.g., m×n memory cells) arranged at intersections of the word lines (e.g., m word lines, which may also be referred to as rows) and the bit lines (e.g., n bit lines, which may also be referred to as columns). Memory cells can include any one of a number of different memory media types, including capacitive, phase change, magnetoresistive, ferroelectric, or the like. The selection of a word line WL may be performed by a row decoder 140, and the selection of a bit line BL may be performed by a column decoder 145. Sense amplifiers (SAMP) may be provided for corresponding bit lines BL and connected to at least one respective local I/O line pair (LIOT/B), which may in turn be coupled to at least one respective main I/O line pair (MIOT/B), via transfer gates (TG), which can function as switches. The memory array 150 may also include plate lines and corresponding circuitry for managing their operation.

The memory device 100 may employ a plurality of external terminals that include command and address terminals coupled to a command bus and an address bus to receive command signals CMD and address signals ADDR, respectively. The memory device may further include a chip select terminal to receive a chip select signal CS, clock terminals to receive clock signals CK and CKF, data clock terminals to receive data clock signals WCK and WCKF, data terminals DQ, RDQS, DBI (for data bus inversion function), and DMI (for data mask inversion function), power supply terminals VDD, VSS, VDDQ, and VSSQ.

The command terminals and address terminals may be supplied with an address signal and a bank address signal from outside. The address signal and the bank address signal supplied to the address terminals can be transferred, via a command/address input circuit 105, to an address decoder 110. The address decoder 110 can receive the address signals and supply a decoded row address signal (XADD) to the row decoder 140 (which may be referred to as a row driver), and a decoded column address signal (YADD) to the column decoder 145 (which may be referred to as a column driver). The address decoder 110 can also receive the bank address portion of the ADDR input and supply the decoded bank address signal (BADD) to both the row decoder 140 and the column decoder 145. In some embodiments, the command/address input circuit 105 may be coupled with a test mode (TM) control circuit 175 and relay commands associated with various test mode functions thereto. Further, the command/address input circuit 105 may be coupled with an access control module 185 that is coupled with the TM control circuit 175. The access control module 185 may deactivate (e.g., disable) the TM control circuit 175 when a certain condition is satisfied such that the memory device 100 (in conjunction with the access control module 185) may block undesired accesses to its fuse array 180.

In some embodiments, the access control module 185 may monitor a predefined event associated with the memory device 100, where the predefined event includes one or more operating parameters of the memory device 100, one or more commands directed to the memory device 100, or both. Further, the access control module 185 may determine that the predefined event satisfies a threshold. Subsequently, the access control module 185 may disable a circuit (e.g., the TM control circuit 175) configured to access a fuse array of the memory device 100 based on the determination. In some embodiments, the access control module 185 is coupled with the clock input circuit 120 such that the access control module 185 may count a quantity of clock cycles in response to an instance of the predefined event. The access control module 185 may store the quantity of clock cycles within the memory device 100 such that the access control module 185 may compare the stored quantity of clock cycles with the threshold, where determining the predefined event satisfying the threshold is when the quantity of clock cycles is greater than or equal to the threshold.

The TM control circuit 175 may be coupled with the fuse array 180. The fuse array 180 includes an array of fuses that may be considered as one-time programmable nonvolatile memory elements. The fuse array 180 may store various operational information for the memory device 100 by programming one or more fuses therein, such as trim setting conditions including specific timing and/or voltage parameters, read/write clock conditions based on the read/write timing outcomes, redundancy implementation information used for repairing a portion of the memory array 150, among others. In some cases, the fuses in the fuse array 180 may exhibit a high-resistance state (e.g., logic 0) upon fabricating the memory device 100—e.g., via an oxide layer disposed between two conductive layers. One or more fuses in the fuse array 180 may be programmed to exhibit a low-resistance state (e.g., logic 1) when a fuse programming voltage (or current) is applied across the one or more fuses—e.g., by physically altering (rupturing) the oxide layer by means of electrical stress such that the two conductive layers are connected via a conductive path. As such, once the fuses are programmed (e.g., the oxide layer is ruptured to exhibit a low-resistance state, logic 1), the programmed fuses may not be un-programmed (e.g., restoring their original high-resistance state, logic 0). In some cases, such fuses may be referred to as anti-fuses.

Moreover, the fuse programming voltage (or current) may correspond to a greater voltage (or current) than an operational voltage (or current) of circuits in the memory device 100 (e.g., the command/address input circuit 105, the address decoder 110, the command decoder 115) because the oxide layer included in the fuses may be the same oxide layer included in the circuits—e.g., a gate oxide of metal-oxide-semiconductor (MOS) transistors used to build the circuits. Accordingly, access to the TM control circuit 175 including the fuse programming capability needs to be strictly controlled to avoid undesired or nefarious programming of the fuse array 180 and/or unintended activation of the fuse programming voltage (or current). As described in greater details herein, the memory device 100 (in conjunction with the access control module 185) may block an access to the fuse array 180, by disabling the TM control circuit 175 (or the fuse access function thereof) when a predefined event satisfies a threshold.

The command and address terminals may be supplied with command signals CMD, address signals ADDR, and chip select signals CS, from a memory controller. The command signals may represent various memory commands from the memory controller (e.g., including access commands, which can include read commands and write commands). The chip select signal CS may be used to select the memory device 100 to respond to commands and addresses provided to the command and address terminals. When an active CS signal is provided to the memory device 100, the commands and addresses can be decoded and memory operations can be performed. The command signals CMD may be provided as internal command signals ICMD to the command decoder 115 via the command/address input circuit 105. The command decoder 115 may include circuits to decode the internal command signals ICMD to generate various internal signals and commands for performing memory operations, for example, a row command signal to select a word line and a column command signal to select a bit line. The internal command signals can also include output and input activation commands, such as clocked command CMDCK (not shown in FIG. 1).

The command decoder 115, in some embodiments, may further include one or more registers 118 for tracking various counts or values (e.g., counts of refresh commands received by the memory device 100, self-refresh operations performed by the memory device 100, a quantity of one or more instances of a predefined event such as a number of read commands directed to the memory device 100, a quantity of clock cycles since a power-up sequence of the memory device 100). In some embodiments, the registers 118 may be located elsewhere in the memory device 100 (i.e., the command decoder 115 may not include the registers 118). In some embodiments, a subset of registers 118 may be referred to as mode registers and configured to store operational parameters via executing commands directed thereto (e.g., LMR commands) to provide flexibility in performing various functions, features, and modes—e.g., test mode functions.

When a read command is issued to a bank with an open row and a column address is timely supplied as part of the read command, read data can be read from memory cells in the memory array 150 designated by the row address (which may have been provided as part the Activate command identifying the open row) and column address. The read command may be received by the command decoder 115, which can provide internal commands to input/output circuit 160 so that read data can be output from the data terminals DQ, RDQS, DBI, and DMI via read/write amplifiers 155 and the input/output circuit 160 according to the RDQS clock signals. The read data may be provided at a time defined by read latency information RL that can be programmed in the memory device 100, for example, in a mode register (e.g., register 118). The read latency information RL can be defined in terms of clock cycles of the CK clock signal. For example, the read latency information RL can be a number of clock cycles of the CK signal after the read command is received by the memory device 100 when the associated read data is provided.

When a write command is issued to a bank with an open row and a column address is timely supplied with as part of the write command, write data can be supplied to the data terminals DQ, DBI, and DMI according to the WCK and WCKF clock signals. The write command may be received by the command decoder 115, which can provide internal commands to the input/output circuit 160 so that the write data can be received by data receivers in the input/output circuit 160, and supplied via the input/output circuit 160 and the read/write amplifiers 155 to the memory array 150. The write data may be written in the memory cell designated by the row address and the column address. The write data may be provided to the data terminals at a time that is defined by write latency WL information. The write latency WL information can be programmed in the memory device 100, for example, in a mode register (e.g., register 118). The write latency WL information can be defined in terms of clock cycles of the CK clock signal. For example, the write latency information WL can be a number of clock cycles of the CK signal after the write command is received by the memory device 100 when the associated write data is received.

The power supply terminals may be supplied with power supply potentials VDD and VSS. These power supply potentials VDD and VSS can be supplied to an internal voltage generator circuit 170. The internal voltage generator circuit 170 can generate various internal potentials VPP, VOD, VARY, VPERI, and the like based on the power supply potentials VDD and VSS. The internal potential VPP can be used in the row decoder 140, the internal potentials VOD and VARY can be used in the sense amplifiers included in the memory array 150, and the internal potential VPERI can be used in many other circuit blocks. In some embodiments, the internal potential VPERI may include a fuse programming voltage that may be supplied to the fuse array 180 (in conjunction with the TM control circuit 175, in some implementations).

The power supply terminal may also be supplied with power supply potential VDDQ. The power supply potential VDDQ can be supplied to the input/output circuit 160 together with the power supply potential VSS. The power supply potential VDDQ can be the same potential as the power supply potential VDD in an embodiment of the present technology. The power supply potential VDDQ can be a different potential from the power supply potential VDD in another embodiment of the present technology. However, the dedicated power supply potential VDDQ can be used for the input/output circuit 160 so that power supply noise generated by the input/output circuit 160 does not propagate to the other circuit blocks.

The clock terminals and data clock terminals may be supplied with external clock signals and complementary external clock signals. The external clock signals CK, CKF, WCK, WCKF can be supplied to a clock input circuit 120. The CK and CKF signals can be complementary, and the WCK and WCKF signals can also be complementary. Complementary clock signals can have opposite clock levels and transition between the opposite clock levels at the same time. For example, when a clock signal is at a low clock level a complementary clock signal is at a high level, and when the clock signal is at a high clock level the complementary clock signal is at a low clock level. Moreover, when the clock signal transitions from the low clock level to the high clock level the complementary clock signal transitions from the high clock level to the low clock level, and when the clock signal transitions from the high clock level to the low clock level the complementary clock signal transitions from the low clock level to the high clock level.

Input buffers included in the clock input circuit 120 can receive the external clock signals. For example, when enabled by a CKE signal from the command decoder 115, an input buffer can receive the CK and CKF signals and the WCK and WCKF signals. The clock input circuit 120 can receive the external clock signals to generate internal clock signals ICLK. The internal clock signals ICLK can be supplied to an internal clock circuit 130. The internal clock circuit 130 can provide various phase and frequency controlled internal clock signal based on the received internal clock signals ICLK and a clock enable signal CKE from the command decoder 115. For example, the internal clock circuit 130 can include a clock path (not shown in FIG. 1) that receives the internal clock signal ICLK and provides various clock signals to the command decoder 115. The internal clock circuit 130 can further provide input/output (IO) clock signals. The IO clock signals can be supplied to the input/output circuit 160 and can be used as a timing signal for determining an output timing of read data and the input timing of write data. The IO clocksignals can be provided at multiple clock frequencies so that data can be output from and input to the memory device 100 at different data rates. A higher clock frequency may be desirable when high memory speed is desired. A lower clock frequency may be desirable when lower power consumption is desired. The internal clock signals ICLK can also be supplied to a timing generator 135 and thus various internal clock signals can be generated.

The memory device 100 can be connected to any one of a number of electronic devices capable of utilizing memory for the temporary or persistent storage of information, or a component thereof. For example, a host device of memory device 100 may be a computing device such as a desktop or portable computer, a server, a hand-held device (e.g., a mobile phone, a tablet, a digital reader, a digital media player), or some component thereof (e.g., a central processing unit, a co-processor, a dedicated memory controller, etc.). The host device may be a networking device (e.g., a switch, a router, etc.) or a recorder of digital images, audio and/or video, a vehicle, an appliance, a toy, or any one of a number of other products. In one embodiment, the host device may be connected directly to memory device 100, although in other embodiments, the host device may be indirectly connected to memory device (e.g., over a networked connection or through intermediary devices).

Figure 2A:
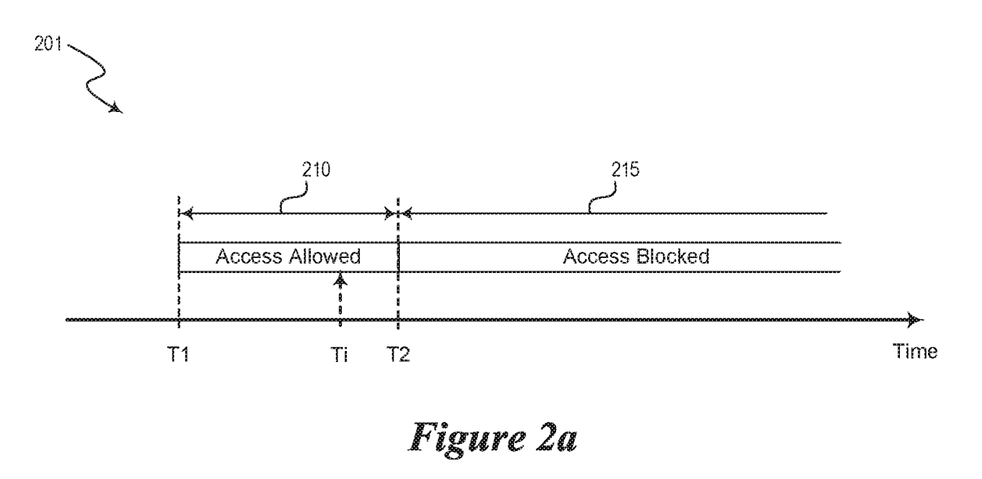
FIG. 2a is a conceptual diagram illustrating self-lock security for a memory device and FIG. 2b shows a flowchart illustrating self-lock security operations in accordance with an embodiment of the present technology.
Figure 3:
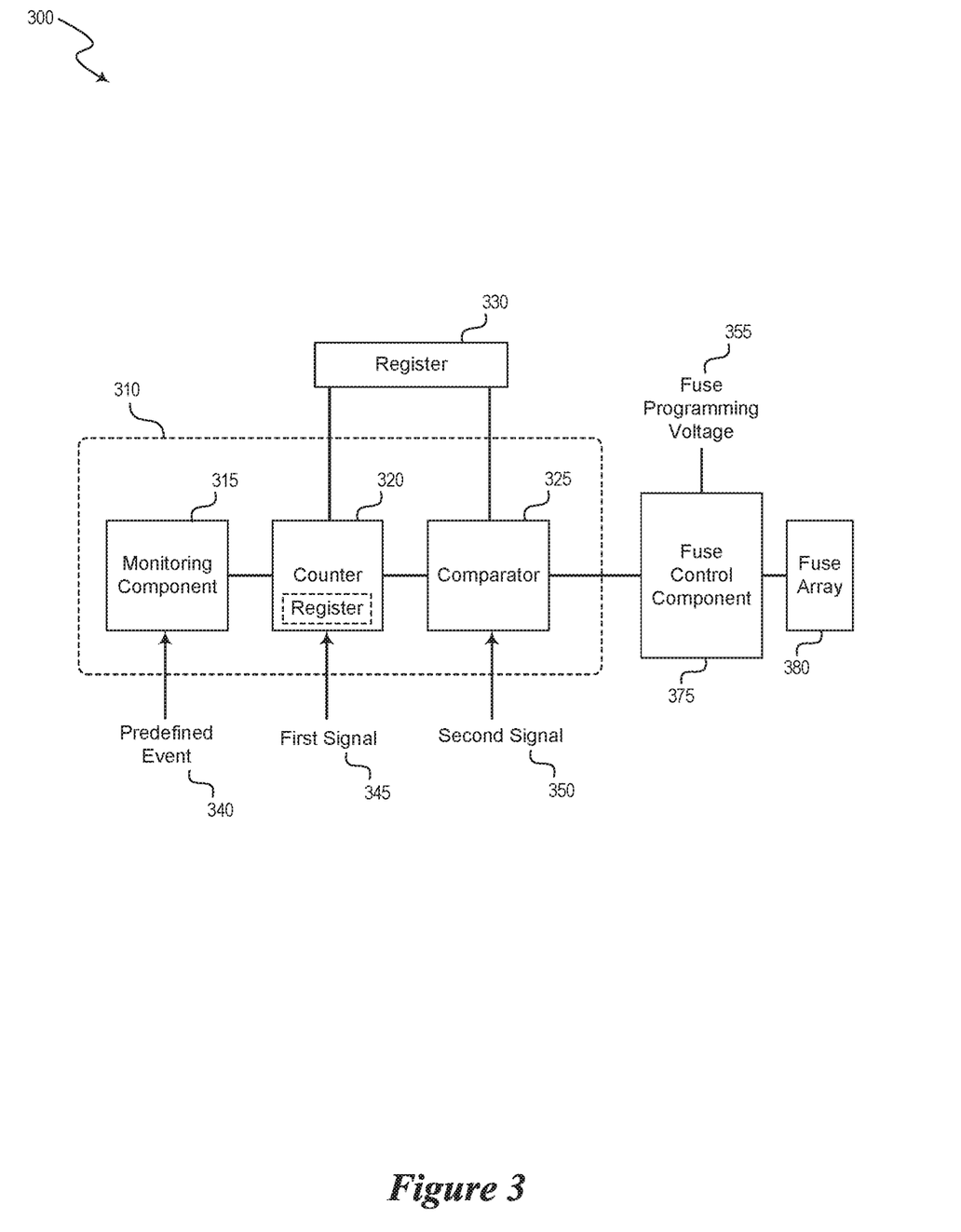
FIG. 3 is a block diagram schematically illustrating a circuit configuration of a memory device in accordance with embodiments of the present technology.

FIG. 2a is a conceptual diagram 201 illustrating self-lock security for a memory device in accordance with an embodiment of the present technology. The diagram 201 may be regarded as illustrating a time-based self-lock security feature. The diagram 201 shows a time axis on which a first event occurs at time T1 and a second event occurs at time T2. A period 210 between time T1 and time T2 indicates duration during which a host device or user may access a fuse array (e.g., the fuse array 180) of the memory device (e.g., the memory device 100). A time duration 215 since time T2, which may be indefinite so long as an operating voltage is supplied to the memory device, indicates another period during which the host device or user may not access the fuse array of the memory device—e.g., the fuse array access is locked, in some cases, via deactivating a circuit configured to access the fuse array (e.g., the TM control circuit 175 or a fuse access control circuit thereof).

In some embodiments, time T1 may relate to a power-up event of the memory device. That is, the memory device may monitor a voltage supplied to the memory device (e.g., VDD described with reference to FIG. 1) and determine at time T1 that the voltage exceeds a certain portion (e.g., 70%, 80%, 90%) of a full operating voltage (e.g., 1.2 V) specified by an applicable industry standard specification—e.g., Joint Electron Device Engineering Council (JEDEC) specification for double data rate 5 (DDR5). Further, the memory device may initiate counting a quantity of clock cycles (e.g., based on the internal clock signals ICLK generated by the clock input circuit 120 as described with reference to FIG. 1) in response to determining the power-up event at time T1. The memory device may store the quantity of clock cycles that correlates to a time elapsed since the power-up event in one or more registers (e.g., registers 118 described with reference to FIG. 1) such that the memory device can compare the stored quantity of clock cycles with a threshold (e.g., 500 μsec, 1 msec). Subsequently, the memory device (e.g., the access control module 185) may determine at time T2 that the time elapsed since the power-up event is greater than the threshold (e.g., 500 μsec, 1 msec) and disable (or deactivate) the circuit (e.g., the TM control circuit 175) to block further accesses to the fuse array—e.g., locking the fuse array on the memory device's own determination, hence self-locking.

In some embodiments, time T1 may relate to a particular command that the memory device executes—e.g., a first Activate (ACT) command to open a row in a particular bank. For example, the memory device may monitor a time elapsed since the first ACT command is executed at time T1 (e.g., counting a quantity of clock cycles in response to determining the execution of first ACT command at time T1) and compare the time with a threshold (e.g., 200 nsec, 500 nsec). Subsequently, the memory device (e.g., the access control module 185) may determine at time T2 that the time elapsed since execution of the first ACT command is greater than the threshold (e.g., 200 nsec, 500 nsec) and disable the circuit (e.g., the TM control circuit) to block further accesses to the fuse array. In some implementations, time T1 may correspond to time T2. In other words, the memory device may disable the circuit to block further accesses to the fuse array immediately after determining that the memory device completed executing the first ACT command.

In some embodiments, time T1 may relate to completion of a certain procedure that the memory device may perform—e.g., Initialize (INIT) procedure that the memory device performs after a power-up event. For example, the memory device may monitor a time elapsed since the INIT procedure is completed at time T1 (e.g., counting a quantity of clock cycles in response to determining completion of the INIT procedure at time T1) and compare the time with a threshold (e.g., 750 nsec, 1 μsec). Subsequently, the memory device may determine at time T2 that the time elapsed since completing the INIT procedure is greater than the threshold (e.g., 750 nsec, 1 μsec) and disable the circuit to block further accesses to the fuse array. In some implementations, time T1 may correspond to time T2. In other words, the memory device may disable the circuit to block further accesses to the fuse array immediately after determining that the memory device completed the INIT procedure.

In some embodiments, the memory device may be configured to pause counting the quantity of clock cycles when a certain condition is satisfied. For example, at intermediate time Ti during the period 210, the circuit (e.g., the TM control circuit 175) may be activated to access the fuse array 180. In some implementations, the memory device (e.g., the access control module 185) may determine that the circuit is activated (e.g., the fuse array 180 is being programmed) by monitoring a voltage supplied to the circuit (e.g., 3 V, the fuse programming voltage) that is greater than an operating voltage (e.g., 1.2 V, VDD) of the memory device. In this manner, the memory device may extend the period 210 such that the circuit can complete the fuse programming operation without being locked out at time T2. Once the memory device determines that the fuse programming operation is complete (e.g., the fuse programming voltage is no longer supplied to the TM control circuit 175), the memory device may resume counting the quantity of clock cycles to enable the time-based self-lock security feature.

Figure 2B:
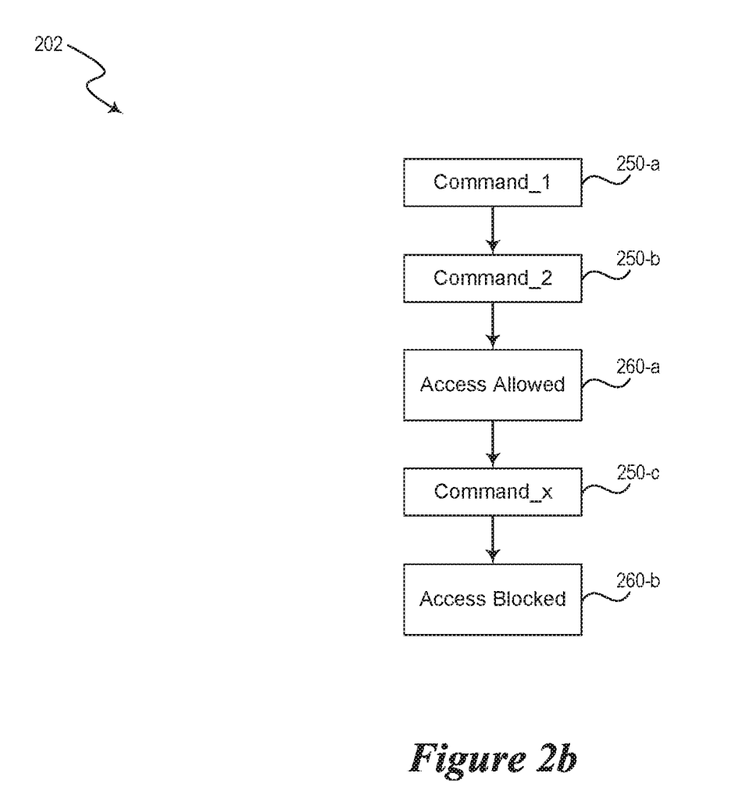

FIG. 2b shows a flowchart 202 illustrating self-lock security feature for a memory device in accordance with an embodiment of the present technology. The flowchart 202 may be regarded as illustrating a command-based self-lock security feature. The flowchart 202 includes a sequence of commands directed to the memory array denoted as boxes 250 and fuse accesses denoted as boxes 260. Each box 250 may represent one or more commands, such as a read command, a write command, ACT command, or the like. In some embodiments, the memory device may be configured to monitor one or more commands directed to the memory device and store a quantity of one or more instances of the commands in the memory device. Further, the memory device may be configured to compare the stored quantity of one or more commands with a threshold to determine the one or more commands satisfies the threshold—as described in more details below. The memory device may block accesses to the fuse array access based on the determination, in some cases, via deactivating a circuit configured to access the fuse array (e.g., the TM control circuit 175 or a fuse access control circuit thereof).

In some embodiments, each box 250 may include a same command—e.g., a read command or any command—directed to the memory device. As such, the example flowchart 202 may represent a self-lock security feature based on a quantity of the commands directed to the memory device—e.g., the threshold being three (3) read commands. That is, the memory device (e.g., the access control module 185) monitors read commands directed to its memory array (e.g., the memory array 150 described with reference to FIG. 1) and store the quantity of read commands in a register (e.g., register 118). At box 260-a, the memory device may allow accessing the fuse array by a host device or user based on the quantity of read commands (e.g., two (2) read commands at boxes 250-a and 250-b) that is less than the threshold (i.e., three (3) read commands directed to the memory device). At box 250-c, the memory device may update the quantity of the read commands directed to the memory device as three (3) and determine that the threshold is satisfied. Subsequently, the memory device may disable the circuit (e.g., the TM control circuit 175) to block further accesses to the fuse array by the host device or user. For example, at box 260-b, an access command directed to the fuse array received after the third read command at box 250-c is blocked. The example flowchart 202 depicts the threshold corresponding to the three (3) read commands directed to the memory device to prohibit any fuse accesses thereafter, but the present technology is not limited thereto. For example, the threshold may correspond to any quantity (e.g., one (1), two (2), four (4), even more) of any commands (e.g., write commands, ACT commands, Precharge commands).

In some embodiments, each box 250 may include a same command or a different command directed to the memory device. For example, box 250-*a* includes a read command, box 250-*b* a write command, and box 250-*c* a read command. As such, the example flowchart 202 may represent a self-lock security feature based on the threshold corresponding to a specific sequence of one or more commands—e.g., a read command, a write command, and a read command. At box 260-*a*, the memory device may allow accessing the fuse array by a host device or user based on that the threshold comprising the sequence of commands is not yet satisfied. (e.g., a first read command at box 250-*a* followed by a write command at box 250-*b*). In some implementations, additional commands (e.g., LMR commands) may be present between box 260-*a* and box 260-*b*. At box 250-*c*, the memory device may update the sequence of commands directed to the memory device as a first read command at box 250-*a*, a write command at box 250-*b*, and a second read command at box 250-*c* and determine that the threshold is satisfied. Subsequently, the memory device may disable the circuit (e.g., the TM control circuit 175) to block further accesses to the fuse array by the host device or user. For example, at box 260-*b*, an access command directed to the fuse array received after the second read command at box 250-*c* is blocked. The example flowchart 202 depicts the threshold corresponding to three specific commands directed to the memory device to prohibit any fuse accesses thereafter, but the present technology is not limited thereto. For example, the threshold may correspond to any combinations of any quantity (e.g., one (1), two (2), four (4), even more) of any commands (e.g., write commands, ACT commands, Precharge commands, LMR commands).

In some embodiments, box 250-*c* may include one or more commands that correspond to a threshold—e.g., a first read command, a write command, a second read command—irrespective of previous commands included in either box 250-*a*, or box 250-*b*, or both. When the memory device determines that the threshold is satisfied at box 250-*c* (e.g., box 250-*c* comprising a first read command, a write command, a second read command), the memory device may disable the circuit (e.g., the TM control circuit 175) to block further accesses to the fuse array by the host device or user. For example, at box 260-*b*, an access command directed to the fuse array received after the specific sequence of commands is blocked.

In one embodiment, box 250-*c* may include a command that programs a specific mode register (e.g., a multipurpose register). Thus, a threshold corresponds to programming the specific mode register in this embodiment. When the memory device determines that the threshold is satisfied at box 250-*c* (e.g., LMR command programming the multipurpose register is received and executed at box 250-*c*), the memory device may disable the circuit (e.g., the TM control circuit 175) to block further accesses to the fuse array by the host device or user. For example, at box 260-*b*, an access command directed to the fuse array received after the multipurpose register is programmed is blocked.

In some embodiments, the time-based self-lock security feature illustrated in the diagram 201 and the command-based self-lock security feature illustrated in the flowchart 202 may be combined. For example, the one or more commands at box 250-*c* (e.g., the third read command, the LMR command programming the multipurpose register) that satisfies the threshold (e.g., three read commands directed to the memory device, programmed multipurpose mode register) may correspond to the first event at time T1 depicted in diagram 201. Thereafter, instead of immediately blocking accesses to the fuse array, the memory device may allow accesses to the fuse array during the period 210.

In some embodiments, once the memory device blocks fuse array accesses, the memory array may require a power off-and-on sequence to allow accesses to the fuse array. In some embodiments, the memory device may be configured to allow accesses to the fuse array when a certain condition is met—e.g., when a specific sequence of commands is received from the host device or user—such that the power off-and-on sequence may be avoided.

FIG. 3 is a block diagram 300 schematically illustrating a circuit configuration of a memory device in accordance with an embodiment of the present technology. The diagram 300 may include aspects of circuits and components of the memory device 100 that are associated with the fuse access function and the fuse array described with reference to FIG. 1. The diagram 300 includes a register 330 (which may be an example of or include aspects of the register 118), a fuse control component 375 (which may be an example of or include aspects of the TM control circuit 175), and a fuse array 380 (which may be an example of or include aspects of the fuse array 180). Further, the diagram 300 illustrates an access control module 310 (which may be an example of or include aspects of the access control module 185) that is coupled with the register 330 and with the fuse control component 375.

In some embodiments, the access control module 310 includes a monitoring component 315, a counter 320, and a comparator 325, which may include various active components (e.g., transistors) and/or passive components (e.g., resistors, capacitors, conductors) known to one of skilled in the relevant art. The access control module 310 may also be configured to monitor a predefined event 340 associated with the memory device, and to receive a first signal 345 and a second signals 350. The access control module 310 may be configured to disable the fuse control component 375 when the predefined event 340 satisfy a threshold. The predefined event 340 may include one or more operating parameters of the memory device (e.g., the power supply potentials VDD and VSS, the clock signals CK and CKF), one or more commands directed to the memory device (e.g., read commands, write commands, ACT commands, LMR commands), or both.

The monitoring component 315 may be configured to monitor the predefined event 340 associated with the memory device. In some embodiments, the predefined event 340 may be related to a power-up event where a voltage supplied to the memory device (e.g., VDD) exceeds a certain percentage of an operating voltage (e.g., 1.2 V) of the memory device. In some embodiments, the predefined event 340 may be related one or more commands directed to the memory device—e.g., a read command received from a host device, execution of a read command outputting data to a host device, an LMR command that programs a certain mode register (e.g., a multipurpose register). In some embodiments, the predefined event 340 may be related to a procedure (e.g., an initialization procedure that follows a power-up event of the memory device) that the memory device performs. In some embodiments, the predefined event 340 may be related to certain patterns in the one or more commands. For example, the predefined event 340 may correspond to three read commands (e.g., three consecutive read commands or three read commands interspersed with other commands) directed to the memory device, or a specific sequence of commands (e.g., a sequence comprising a first read command, a write command, and a second read command, which may be consecutive or interspersed with other commands). The monitoring component 315 may indicate one or more instances of the predefined event 340 to the counter 320 based on monitoring the predefined event 340 associated with the memory device.

The counter 320 may be configured to store a quantity of one or more instances of the predefined event 340, a time that correlates with the one or more instances of the predefined event 340, or both. In some embodiments, the counter 320 may be configured to receive the first signal 345 (e.g., the internal clock signals ICLK described with reference to FIG. 1), an indication of one or more instances of the predefined event 340 from the monitoring component 315, or both. By way of example, when the monitoring component 315 indicates to the counter 320 that a first instance of the predefined event 340 (e.g., a power-up event) occurred, the counter 320 may start to count a quantity of clock cycles included in the first signal 345 in response to receiving the indication. As such, the counter 320 may keep track of a time elapsed since the power-up event. In another example, when the monitoring component 315 indicates to the counter 320 each instance of one or more read commands directed to the memory device, the counter 320 may update the quantity of instances associated with the predefined events—e.g., a first read command, a second read command, and so on—such that the counter 320 may keep track of the quantity of the instances of the predefined event 340. In some embodiments, the counter 320 may be configured to store such information related to the predefined event 340 (e.g., a time elapsed since the power-up event, a quantity of read commands directed to the memory device) in the register 330. In some embodiments, the counter 320 may be configured to include a register to store such information related to the predefined events 340 and transmit the information to the comparator 325.

The comparator 325 may be configured to compare the stored quantity of one or more instances with a threshold that may be provided as part of the second signal 350. The comparator 325, in conjunction with the counter 320 in some cases, may determine that the predefined event 340 satisfies the threshold. In some cases, the threshold may correspond to a specific quantity of a command directed to the memory device. For example, the comparator 325 may compare the stored quantity of one or more instances of the predefined event 340 (e.g., two (2) instances of read commands stored either in the register 330 or the register of the counter 320) with the threshold (e.g., three (3) instances of read commands), where determining the predefined event 340 (e.g., instances of read commands) satisfying the threshold (e.g., three (3) read commands) is when the quantity of one or more instances is greater than or equal to the threshold. In some cases, the threshold may correspond to a specific time elapsed (or a quantity of clock cycles that is equal to or greater than the specific time elapsed) since a predefined event 340 (e.g., a power-up event) has occurred. For example, the comparator 325 may compare the stored quantity of clock cycles (e.g., N clock cycles corresponding to 10 msec, stored either in the register 330 or the register of the counter 320) with the threshold (e.g., 20 msec or M clock cycles corresponding to 20 msec), where determining the predefined event 340 (e.g., a time elapsed since a power-up event) satisfying the threshold (e.g., 20 msec, M clock cycles corresponding to 20 msec) is when the stored quantity of clock cycles (e.g., N clock cycles) is greater than or equal to the threshold (e.g., M clock cycle)—e.g., the time elapsed since the power-up event is greater than or equal to the threshold (e.g., 20 msec). In some embodiments, the comparator 325 may disable the fuse control component 375 based on determining that the predefined event 340 has satisfied the threshold such that subsequent accesses to the fuse array 380 may be blocked.

In some embodiments, the access control module 310 may allow reading the fuse array 380 when accesses to the fuse array 380 is blocked. For example, the access control module 310 may deactivate the fuse programming voltage 355 instead of disabling the fuse control component 375. In this manner, the fuse control component 375 may retrieve (e.g., read) information from the fuse array 380, but may not modify or write information to the fuse array 380 in the absence of the fuse programming voltage 355. In some embodiments, the access control module 310 may pause counting the quantity of clock cycles when the fuse control component 375 is activated to access (e.g., read, write) the fuse array 380. In this manner, the access control module 310 may provide a reliable duration for a host device to access the fuse array 380 once the fuse access is allowed and in progress. Subsequently, the access control module 310 may resume counting the quantity of clock cycles when the fuse control component 375 is deactivated after accessing the fuse array 380. In some embodiments, the access control module 310 may determine that the fuse programming voltage 355 is enabled to activate the fuse control component 375—i.e., the voltage supplied to the fuse control component 375 (e.g., 3V) is greater than an operating voltage of the memory device (e.g., 1.2 V, VDD)—and pause counting the quantity of clock cycles based on the determination.

Figure 4:
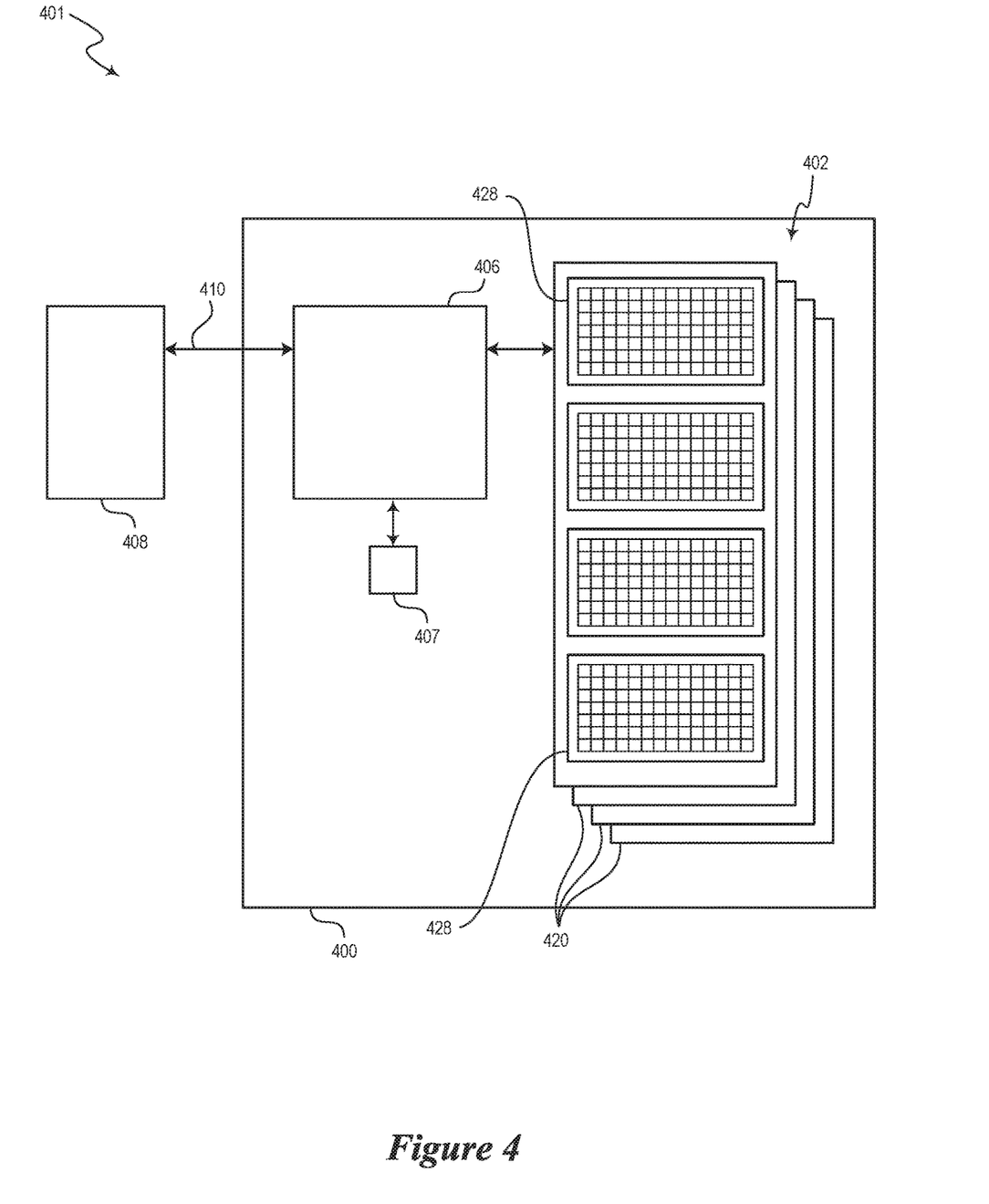
FIG. 4 is a block diagram schematically illustrating a memory system in accordance with an embodiment of the present technology.

FIG. 4 is a block diagram schematically illustrating a memory system 401 in accordance with an embodiment of the present technology. The memory system 401 includes a memory device 400, which may be an example of or include aspects of the memory device 100 described with reference to FIG. 1. As shown, the memory device 400 includes a main memory 402 (e.g., DRAM, NAND flash, NOR flash, FeRAM, PCM, etc.) and control circuitry 406 coupled to a host device 408 (e.g., an upstream central processing unit (CPU)). The main memory 402 may be an example of or include aspects of the memory array 150 described with reference to FIG. 1. The control circuitry 406 include aspects of various components described with reference to FIGS. 1 and 3. For example, the control circuitry 406 may include aspects of the command/address input circuit 105, the TM control circuit 175, the access control module 185 or 310, the fuse control component 375, among others. Further, the memory device 400 includes a fuse array 407, which may be an example of or include aspects of the fuse array 180 or 380 described with reference to FIGS. 1 and 3.

The main memory 402 includes a plurality of memory units 420, which each include a plurality of memory cells. The memory units 420 can be individual memory dies, memory planes in a single memory die, a stack of memory dies vertically connected with through-silicon vias (TSVs), or the like. For example, in one embodiment, each of the memory units 420 can be formed from a semiconductor die and arranged with other memory unit dies in a single device package. In other embodiments, multiple memory units 420 can be co-located on a single die and/or distributed across multiple device packages. The memory units 420 may, in some embodiments, also be sub-divided into memory regions 428 (e.g., banks, ranks, channels, blocks, pages, etc.).

The memory cells can include, for example, floating gate, charge trap, phase change, capacitive, ferroelectric, magnetoresistive, and/or other suitable storage elements configured to store data persistently or semi-persistently. The main memory 402 and/or the individual memory units 420 can also include other circuit components, such as multiplexers, decoders, buffers, read/write drivers, address registers, data out/data in registers, etc., for accessing and/or programming (e.g., writing) the memory cells and other functions, such as for processing information and/or communicating with the control circuitry 406 or the host device 408. Although shown in the illustrated embodiments with a certain number of memory cells, rows, columns, regions, and memory units for purposes of illustration, the number of memory cells, rows, columns, regions, and memory units can vary, and can, in other embodiments, be larger or smaller in scale than shown in the illustrated examples. For example, in some embodiments, the memory device 400 can include only one memory unit 420. Alternatively, the memory device 400 can include two, three, four, eight, ten, or more (e.g., 16, 32, 64, or more) memory units 420. Although the memory units 420 are shown in FIG. 4 as including four memory regions 428 each, in other embodiments, each memory unit 420 can include one, two, three, eight, or more (e.g., 16, 32, 64, 100, 128, 256, or more) memory regions.

In one embodiment, the control circuitry 406 can be provided on the same die as the main memory 402 (e.g., including command/address/clock input circuitry, decoders, voltage and timing generators, input/output circuitry, etc.). In another embodiment, the control circuitry 406 can be a microcontroller, special purpose logic circuitry (e.g., a field programmable gate array (FPGA), an application specific integrated circuit (ASIC), control circuitry on a memory die, etc.), or other suitable processor. In one embodiment, the control circuitry 406 can include a processor configured to execute instructions stored in memory to perform various processes, logic flows, and routines for controlling operation of the memory device 400, including managing the main memory 402 and handling communications between the memory device 400 and the host device 408. In some embodiments, the control circuitry 406 can include embedded memory with memory registers for storing, e.g., row counters, bank counters, memory pointers, fetched data, etc. In another embodiment of the present technology, a memory device 400 may not include control circuitry, and may instead rely upon external control (e.g., provided by the host device 408, or by a processor or controller separate from the memory device 400).

The host device 408 can be any one of a number of electronic devices capable of utilizing memory for the temporary or persistent storage of information, or a component thereof. For example, the host device 408 may be a computing device such as a desktop or portable computer, a server, a hand-held device (e.g., a mobile phone, a tablet, a digital reader, a digital media player), or some component thereof (e.g., a central processing unit, a co-processor, a dedicated memory controller, etc.). The host device 408 may be a networking device (e.g., a switch, a router, etc.) or a recorder of digital images, audio and/or video, a vehicle, an appliance, a toy, or any one of a number of other products. In one embodiment, the host device 408 may be connected directly to memory device 400, although in other embodiments, the host device 408 may be indirectly connected to memory device (e.g., over a networked connection or through intermediary devices).

In operation, the control circuitry 406 can directly write or otherwise program (e.g., erase) the various memory regions of the main memory 402. The control circuitry 406 communicates with the host device 408 over a host-device bus or interface 410. In some embodiments, the host device 408 and the control circuitry 406 can communicate over a dedicated memory bus (e.g., a DRAM bus). In other embodiments, the host device 408 and the control circuitry 406 can communicate over a serial interface, such as a serial attached SCSI (SAS), a serial AT attachment (SATA) interface, a peripheral component interconnect express (PCIe), or other suitable interface (e.g., a parallel interface). The host device 408 can send various requests (in the form of, e.g., a packet or stream of packets) to the control circuitry 406. A request can include a command to read, write, erase, return information, and/or to perform a particular operation (e.g., a refresh operation, a TRIM operation, a precharge operation, an activate operation, a wear-leveling operation, a garbage collection operation, etc.).

In some embodiments, the control circuitry 406 can be configured to track operations (e.g., read operations, write operations, erase operations, activate operations, etc.) performed in the main memory 402 (e.g., in a register or table in an embedded memory of the control circuitry 406) in multiple memory units 420 to facilitate performing refresh operations on an as-needed basis. In this regard, the control circuitry 406 can be configured to compare the number or rate of operations experienced by different memory units 420 and to perform or schedule refresh operations on the memory units 420 based on a comparison between the number or rate of operations experienced by the memory units 420. Alternatively, the control circuitry 406 can be configured to perform or schedule refresh operations on the memory units 420 based on a comparison of each memory unit 420 to one or more predetermined thresholds (e.g., threshold numbers of operations, threshold rates of operations, etc.). Accordingly, a memory unit 420 which is the target of operations that exceed a threshold number or rate can be refreshed more frequently than another unit 420, due to the freedom with which different units 420 can be subjected to out-of-order refresh operations.

In some embodiments, the memory device 400 may be configured to monitor a predefined event associated with the memory device 400, where the predefined event includes one or more operating parameters of the memory device 400, one or more commands received from the host device 408 directed to the memory device 400, or both. The memory device may determine that the predefined event satisfies a threshold and disable a circuit (e.g., the TM control circuit 175, the fuse control component 375) configured to access the fuse array 407 of the memory device 400 based on the determination. In some embodiments, the memory device 400 may include a module (e.g., the access control module 310) that is coupled to the circuit such that the memory device may disable the circuit via the module. Such module, in some embodiments, may include a first component (e.g., the monitoring component 315) configured to monitor the predefined event and a second component configured to determine the predefined event satisfies the threshold—e.g., the comparator 325, the counter 320, or both.

Figure 5:
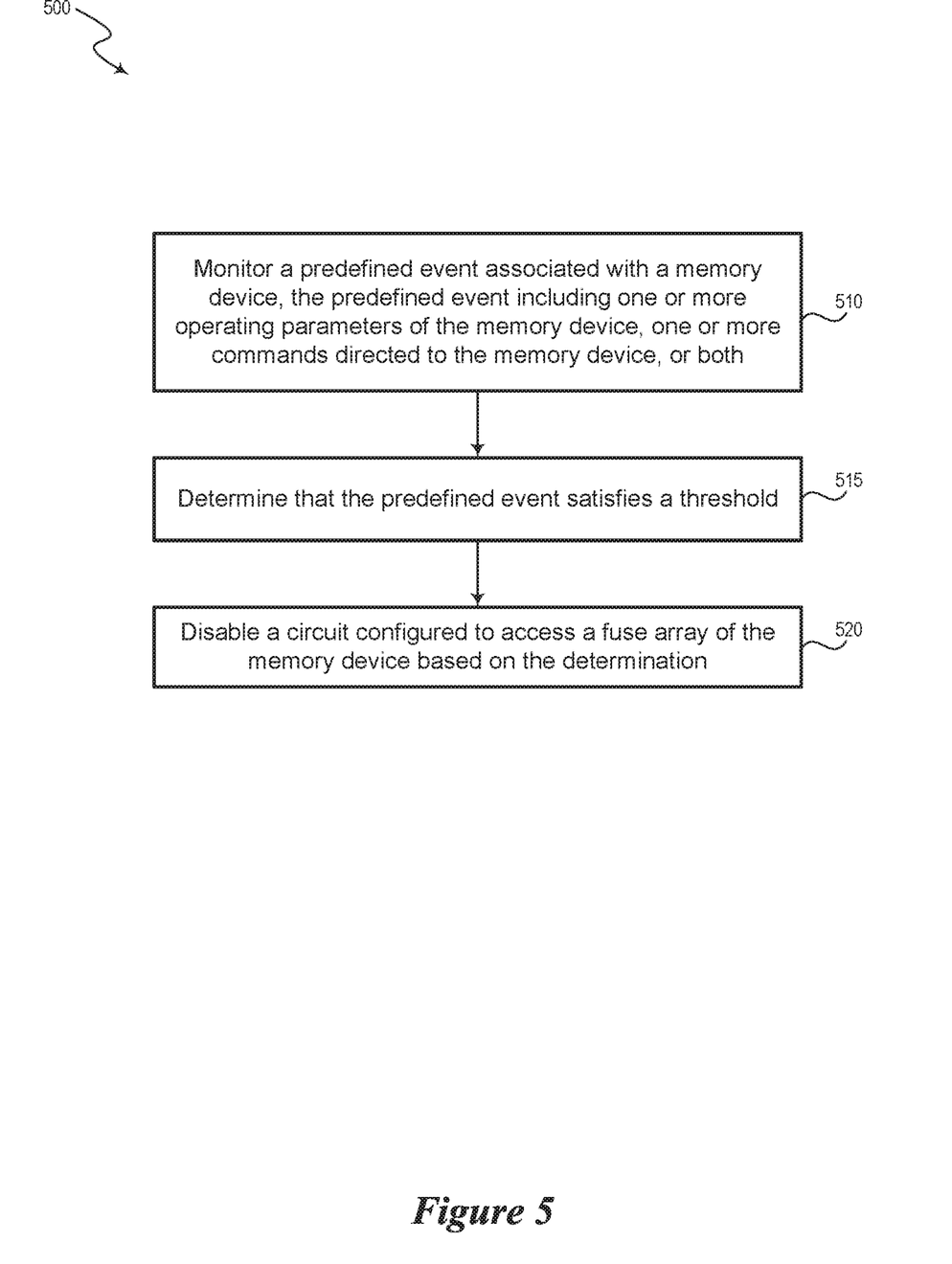
FIGS. 5 and 6 are flowcharts illustrating methods of operating a memory device in accordance with embodiments of the present technology.

FIG. 5 is a flowchart 500 illustrating a method of operating a memory device in accordance with an embodiment of the present technology. The flowchart 500 may be an example of or include aspects of a method that the memory device 100 (or the access control module 185 or 310, or the control circuitry 406 of the memory device 400) may perform as described with reference to FIGS. 1 through 4.

The method includes monitoring a predefined event associated with the memory device, the predefined event including one or more operating parameters of the memory device, one or more commands directed to the memory device, or both (box 510). In accordance with one aspect of the present technology, the monitoring feature of box 510 can be performed by a control circuitry (e.g., the control circuitry 406) or the access control module 185 or 310 (in conjunction with the monitoring component 315, in some implementations) as described with reference to FIGS. 1 through 4.

The method further includes determining that the predefined event satisfies a threshold (box 515). In accordance with one aspect of the present technology, the determining feature of box 515 can be performed by the control circuitry (e.g., the control circuitry 406) or the access control module 185 or 310 as described with reference to FIGS. 1 through 4.

The method further includes disabling a circuit configured to access a fuse array of the memory device based on the determination (box 520). In accordance with one aspect of the present technology, the disabling feature of box 520 can be performed by the control circuitry (e.g., the control circuitry 406) or the access control module 185 or 310 as described with reference to FIGS. 1 through 4.

In some embodiments, the method can further include storing a quantity of one or more instances of the predefined event in the memory device based on monitoring the predefined event. In some embodiments, the method can further include comparing the stored quantity of one or more instances with the threshold, and determining the quantity of one or more instances is greater than or equal to the threshold. In some embodiments, the method can further include counting a quantity of clock cycles in response to an instance of the predefined event and storing the quantity of clock cycles in the memory device. In some embodiments, the method can further include, comparing the stored quantity of clock cycles with the threshold, and determining the quantity of clock cycles is greater than or equal to the threshold.

In some embodiments, the method can further include pausing counting the quantity of clock cycles when the circuit is activated to access the fuse array of the memory device. In some embodiments, the method can further include resuming counting the quantity of clock cycles when the circuit is deactivated after accessing the fuse array of the memory device. In some embodiments, the predefined event may correspond to a specific sequence of commands directed to the memory device, and the threshold may include one or more instances of the specific sequence of commands. In some embodiments, the predefined event may correspond to a voltage supplied to the memory device exceeding a portion of an operating voltage of the memory device, and the threshold may include a fixed duration for the voltage exceeding the portion of the operating voltage. In some embodiments, the predefined event may include a command directed to the memory device, and the threshold may include a fixed duration after the command is executed by the memory device.

Figure 6:
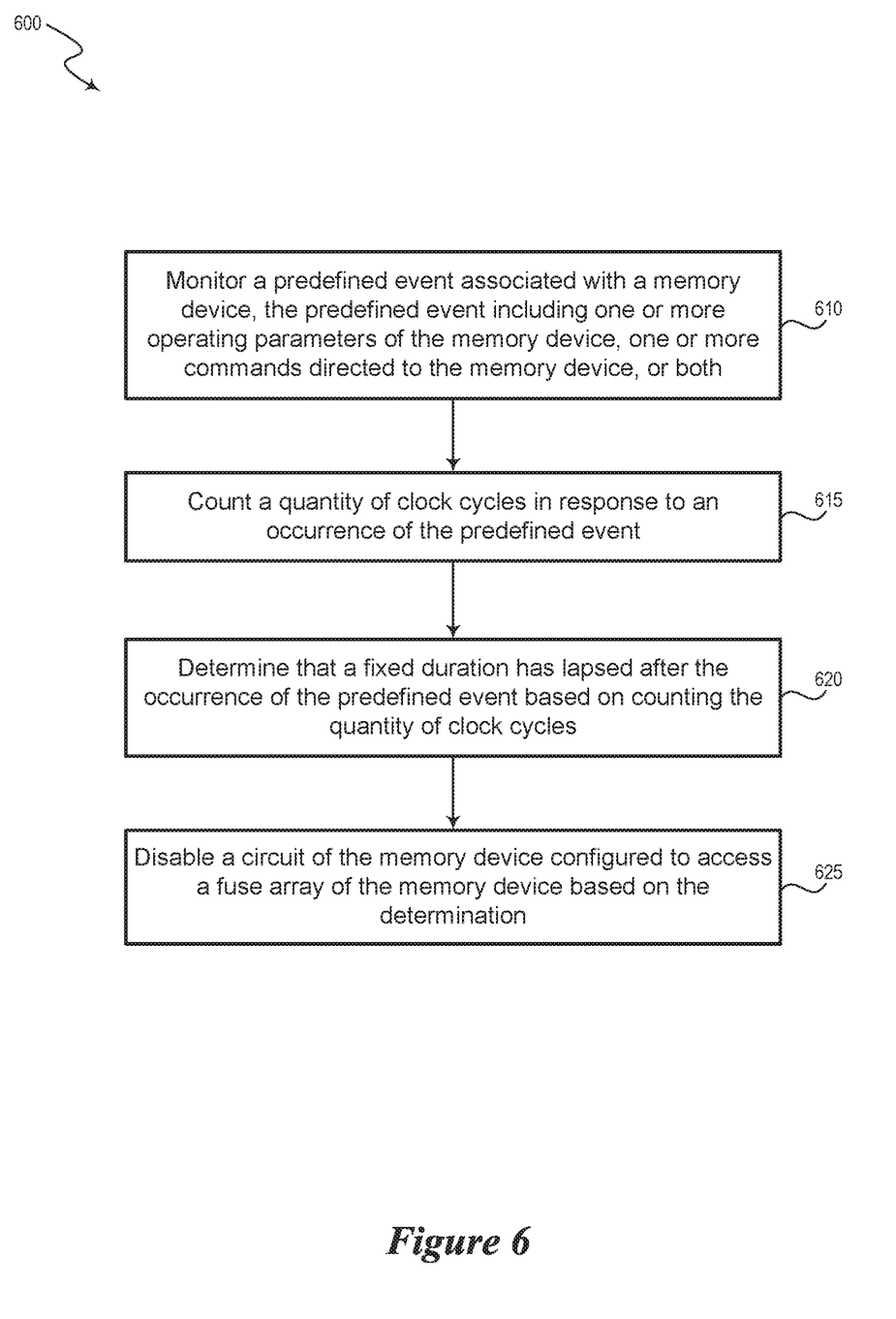

FIG. 6 is a flowchart 600 illustrating a method of operating a memory device in accordance with an embodiment of the present technology. The flowchart 600 may be an example of or include aspects of a method that the memory device 100 (or the access control module 185 or 310, or the control circuitry 406 of the memory device 400) may perform as described with reference to FIGS. 1 through 4.

The method includes monitoring a predefined event associated with the memory device, the predefined event including one or more operating parameters of the memory device, one or more commands directed to the memory device, or both (box 610). In accordance with one aspect of the present technology, the monitoring feature of box 610 can be performed by a control circuitry (e.g., the control circuitry 406) or the access control module 185 or 310 (in conjunction with the monitoring component 315, in some implementations) as described with reference to FIGS. 1 through 4.

The method further includes counting a quantity of clock cycles in response to an occurrence of the predefined event (box 615). In accordance with one aspect of the present technology, the counting feature of box 615 can be performed by a control circuitry (e.g., the control circuitry 406) or the access control module 185 or 310 (in conjunction with the counter 320, in some implementations) as described with reference to FIGS. 1 through 4.

The method further includes determining that a fixed duration has lapsed after the occurrence of the predefined event based on counting the quantity of clock cycles (box 620). In accordance with one aspect of the present technology, the determining feature of box 620 can be performed by the control circuitry (e.g., the control circuitry 406) or the access control module 185 or 310 as described with reference to FIGS. 1 through 4.

The method further includes disabling a circuit of the memory device configured to access a fuse array of the memory device based on the determination (box 625). In accordance with one aspect of the present technology, the disabling feature of box 625 can be performed by the control circuitry (e.g., the control circuitry 406) or the access control module 185 or 310 as described with reference to FIGS. 1 through 4.

In some embodiments, the predefined event may correspond to a voltage supplied to the memory device exceeding a portion of an operating voltage of the memory device. In some embodiments, the predefined event may correspond to a specific sequence of commands directed to the memory device. In some embodiments, the predefined event may correspond to a command that programs a mode register of the memory device. In some embodiments, the predefined event may correspond to a combination of a subset of the one or more commands and a predetermined time span after completing the subset of the one or more commands. In some embodiments, disabling the circuit of the memory device may allow reading the fuse array of the memory device. In some embodiments, the method can further include determining a voltage supplied to the circuit is greater than an operating voltage of the memory device, and pausing counting the quantity of clock cycles based on the determination.

It should be noted that the methods described above describe possible implementations, and that the operations and the steps may be rearranged or otherwise modified and that other implementations are possible. Furthermore, embodiments from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The devices discussed herein, including a memory device, may be formed on a semiconductor substrate or die, such as silicon, germanium, silicon-germanium alloy, gallium arsenide, gallium nitride, etc. In some cases, the substrate is a semiconductor wafer. In other cases, the substrate may be a silicon-on-insulator (SOI) substrate, such as silicon-onglass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

The functions described herein may be implemented in hardware, software executed by a processor, firmware, or any combination thereof. Other examples and implementations are within the scope of the disclosure and appended claims. Features implementing functions may also be physically located at various positions, including being distributed such that portions of functions are implemented at different physical locations.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

From the foregoing, it will be appreciated that specific embodiments of the invention have been described herein for purposes of illustration, but that various modifications may be made without deviating from the scope of the invention. Rather, in the foregoing description, numerous specific details are discussed to provide a thorough and enabling description for embodiments of the present technology. One skilled in the relevant art, however, will recognize that the disclosure can be practiced without one or more of the specific details. In other instances, well-known structures or operations often associated with memory systems and devices are not shown, or are not described in detail, to avoid obscuring other aspects of the technology. In general, it should be understood that various other devices, systems, and methods in addition to those specific embodiments disclosed herein may be within the scope of the present technology.

What is claimed is:

1. A method of operating a memory device, comprising:
monitoring a predefined event associated with the memory device, the predefined event including one or more operating parameters of the memory device, one or more commands directed to the memory device, or both;
counting a quantity of clock cycles in response to an instance of the predefined event;
pausing counting the quantity of clock cycles when the circuit is activated to access the fuse array of the memory device;
determining that the predefined event satisfies a threshold; and
temporarily disabling a circuit configured to access a fuse array of the memory device based on the determination while continuing to operate the memory device such that the memory device can receive one or more commands.

2. The method of claim 1, further comprising:
storing a quantity of one or more instances of the predefined event in the memory device based on monitoring the predefined event.

3. The method of claim 2, further comprising:
comparing the stored quantity of one or more instances with the threshold; and
determining the quantity of one or more instances is greater than or equal to the threshold.

4. The method of claim 1, further comprising:
storing the quantity of clock cycles in the memory device.

5. The method of claim 4, further comprising:
comparing the stored quantity of clock cycles with the threshold; and
determining the quantity of clock cycles is greater than or equal to the threshold.

6. The method of claim 1, further comprising:
resuming counting the quantity of clock cycles when the circuit is deactivated after accessing the fuse array of the memory device.

7. The method of claim 1, wherein:
the predefined event corresponds to a specific sequence of commands directed to the memory device; and
the threshold comprises one or more instances of the specific sequence of commands.

8. The method of claim 1, wherein:
the predefined event corresponds to a voltage supplied to the memory device exceeding a portion of an operating voltage of the memory device; and
the threshold comprises a fixed duration for the voltage exceeding the portion of the operating voltage.

9. The method of claim 1, wherein:
the predefined event comprises a command directed to the memory device; and
the threshold comprises a fixed duration after the command is executed by the memory device.

10. A memory device, comprising:
a circuit configured to access a fuse array of the memory device;
an access control module coupled to the circuit and configured to:
monitor for a predefined event;
count a quantity of clock cycles in response to an instance of the predefined event;
pause counting the quantity of clock cycles when the circuit is activated to access the fuse array of the memory device;
determine the predefined event satisfies a threshold; and
temporarily disable the circuit when the predefined event associated with the memory device satisfies the threshold while the memory device operates to receive one or more commands.

11. The memory device of claim 10, further comprising:
one or more registers to store a quantity of one or more instances of the predefined event or the counted quantity of clock cycles in response to one or more instances of the predefined event.

12. The memory device of claim 11, wherein the access control module is configured to compare the stored quantity of one or more instances of the predefined event or the stored quantity of clock cycles with the threshold.

13. The memory device of claim 10, wherein the predefined event comprises one or more operating parameters of the memory device, one or more commands directed to the memory device, or both.

14. A method of operating a memory device, comprising:
monitoring a predefined event associated with the memory device, the predefined event including one or more operating parameters of the memory device, one or more commands directed to the memory device, or both;
counting a quantity of clock cycles in response to an occurrence of the predefined event;
determining a voltage supplied to the circuit is greater than an operating voltage of the memory device;
pausing counting the quantity of clock cycles based on the determination;
determining that a fixed duration has lapsed after the occurrence of the predefined event based on counting the quantity of clock cycles; and
temporarily disabling a circuit of the memory device configured to access a fuse array of the memory device based on the determination while continuing to operate the memory device such that the memory device can receive one or more commands.

15. The method of claim 14, wherein the predefined event corresponds to a voltage supplied to the memory device exceeding a portion of an operating voltage of the memory device.

16. The method of claim 14, wherein the predefined event corresponds to a specific sequence of commands directed to the memory device.

17. The method of claim 14, wherein the predefined event corresponds to a command that programs a mode register of the memory device.

18. The method of claim 14, wherein the predefined event corresponds to a combination of a subset of the one or more commands and a predetermined time span after completing the subset of the one or more commands.

19. The method of claim 14, wherein disabling the circuit of the memory device allows reading the fuse array of the memory device.

* * * * *